US012616192B2

(12) United States Patent
Thomas et al.

(10) Patent No.: US 12,616,192 B2
(45) Date of Patent: May 5, 2026

(54) COMPOSITIONS AND METHODS FOR PRESERVING OR INCREASING PLATELET FUNCTION

(71) Applicant: Washington University, St. Louis, MO (US)

(72) Inventors: Kimberly Thomas, St. Louis, MO (US); Susan Shea, St. Louis, MO (US); Philip Spinella, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 17/863,124

(22) Filed: Jul. 12, 2022

(65) Prior Publication Data

US 2023/0022659 A1 Jan. 26, 2023

Related U.S. Application Data

(60) Provisional application No. 63/220,627, filed on Jul. 12, 2021.

(51) Int. Cl.
| | |
|---|---|
| *A01N 1/126* | (2025.01) |
| *A01N 1/142* | (2025.01) |
| *A01N 1/146* | (2025.01) |

(52) U.S. Cl.
CPC ............. *A01N 1/126* (2025.01); *A01N 1/142* (2025.01); *A01N 1/146* (2025.01)

(58) Field of Classification Search
CPC .............................. A01N 1/0226; A01N 1/021
USPC ......................................................... 435/374
See application file for complete search history.

(56) References Cited

U.S. PATENT DOCUMENTS

| | | | |
|---|---|---|---|
| 7,989,159 B2 | 8/2011 | Gyongyossy-Issa et al. | |
| 2012/0294842 A1* | 11/2012 | Peter Liu | .............. A61K 35/19 |
| | | | 435/2 |

OTHER PUBLICATIONS

Krebs, Hans Adolf, Chemical composition of blood plasma and serum. Annual review of biochemistry 19.1, 409-430. (Year: 1950).*
Rais, N., Ved, A., Shadab, M., Ahmad, R. and Shahid, M., Taurine, a non-proteinous essential amino acid for human body systems: an overview, Arab Gulf Journal of Scientific Research, vol. 41 No. 1, pp. 48-66 (Year: 2022).*
Miglis, M., Wilder, D., Reid, T., & Bakaltcheva, I., Effect of taurine on platelets and the plasma coagulation system, Platelets, 13(1), 5-10. (Year: 2002).*
Miglis, Mitchell, et al. "Effect of taurine on platelets and the plasma coagulation system." Platelets 13.1 (2002): 5-10. (Year: 2002).*
Santhakumar, A. B., M. D. Linden, and Indu Singh. "Taurine in lower concentration attenuates platelet activity." Food and Public Health 2.2 (2012): 58-64. (Year: 2012).*
Chapman, R. A., M_S Suleiman, and Y. E. Earm. "Taurine and the heart." Cardiovascular research 27.3 (1993): 358-363. (Year: 1993).*

* cited by examiner

Primary Examiner — Maria G Leavitt
Assistant Examiner — Michael Angelo Riga
(74) Attorney, Agent, or Firm — Polsinelli PC

(57) ABSTRACT

Among the various aspects of the present disclosure is the provision of compositions and methods for platelet storage supplementation with an amino acid, such as taurine.

17 Claims, 5 Drawing Sheets
(5 of 5 Drawing Sheet(s) Filed in Color)

80% reduction in taurine from baseline at 21 days cold storage

75% reduction in glutathione from baseline at 21 days cold storage

COMPOSITIONS AND METHODS FOR PRESERVING OR INCREASING PLATELET FUNCTION

CROSS REFERENCE TO RELATED APPLICATIONS

This application claims the benefit of U.S. Provisional Application 63/220,627, filed Jul. 12, 2021 the disclosure of which is hereby incorporated by reference in its entirety.

FIELD OF THE TECHNOLOGY

This disclosure generally relates to solutions, methods, and systems for processing isolated platelets, more particularly, for resuspending and/or storing platelet products.

BACKGROUND

Blood is typically processed to separate various blood components that can be separately used. For example, a unit of donated whole blood can be processed to separate red cells, usually concentrated as packed red cells (PRC), platelets, usually concentrated as platelet concentrate (PC), and plasma. In accordance with typical processing protocols, blood is processed to form, among other fractions, a platelet-containing fluid, e.g., platelet-rich-plasma (PRP) or buffy coat, that are further processed (including centrifugation) to form the PC. Moreover, multiple units of platelets or buffy coat can be pooled before producing the final transfusion product.

In accordance with current conventional blood banking practice, PC produced in a closed system can be stored for up to 5 days before being used as a transfusion product. In some processing protocols, a platelet additive solution is added to the platelet-containing fluid (e.g., the buffy coat) and the platelets are resuspended in the additive solution before the platelets are stored, wherein most of the plasma is removed before the additive solution is added. In order to provide optimal platelet function and viability during storage, it is recommended that the platelet-containing fluid (with or without an additive solution) be maintained at a pH in the range of from 6.8 to 7.4 (European practice), or maintained at a pH of 6.2 or greater (US practice) during the storage period.

However, platelets may become activated during the processing of blood to concentrate the platelets (including during the subsequent resuspension of the platelets in the additive solution), leading to platelet aggregation and a loss of viable platelets in the transfusion product.

Thus, there is a need in the art compositions and methods for resuspending and/or storing platelet products which do not lead to loss of viability and/or function.

SUMMARY

Among the various aspects of the present disclosure platelet solutions (e.g., storage and/or resuspension) as disclosed herein.

Accordingly, one aspect of the present disclosure features a platelet storage solution comprising an amino acid effective to improve or preserve platelet function.

Another aspect of the present disclosure provides methods of increasing or preserving platelets during storage, the methods generally comprise providing platelets; providing a platelet storage supplement comprising an amino acid in an amount effective to improve, increase, or preserve platelet function; and contacting the platelets and the composition, resulting in treated platelets.

In each of the above aspects the platelets are treated with the composition before administering the treated platelets to a subject. In some embodiments, the platelet storage solution further comprises acetate, potassium, magnesium, phosphate, bicarbonate, calcium, citrate, gluconate, glucose, sodium chloride, or combinations thereof.

In some embodiments, the storage solution or methods, the amino acid is taurine or functional variant thereof. In some embodiments, contacting the isolated platelets with the amino acid during storage results in improved, increased, or preserved platelet function by promoting platelet aggregation, stabilizing platelet mitochondria, and/or increasing shelf-life, compared to isolated platelets stored in a solution not supplemented with an amino acid. In some embodiments, platelet function is measured under flow conditions. In some embodiments, an increase in platelet function is measured by an increase in hemostatic function under physiologically relevant flow. In some embodiments, the treated/supplemented platelets are twice-as-fast acting or acts in half the time as unsupplemented platelets. In some embodiments, improved platelet function is measured by increases hemostatic function under physiologically relevant flow.

In some embodiments, the platelets are supplemented at the beginning of storage or during storage. In some embodiments, increased platelet function which held over a week of storage. In some embodiments, the platelets are supplemented any time before transfusion into a patient. In some embodiments, the amino acid is taurine. In some embodiments, the amount effective to improve, increase, or preserve platelet function is about 500 μM. In some embodiments, the platelets are stored in cold storage. In some embodiments, the platelets are stored in room temperature storage. In some embodiments, the platelets are stored for up to about 21 days. In some embodiments, the subject is a cancer patient. In some embodiments, the subject has internal bleeding. In some embodiments, the subject is an actively bleeding patient. In some embodiments, the subject is being treated or has been treated with chemotherapy.

Other objects and/or features will be in part apparent and in part pointed out hereinafter.

BRIEF DESCRIPTION OF THE FIGURES

The patent or patent application file contains at least one drawing executed in color. Copies of this patent or patent application publication with color drawing(s) will be provided by the Office upon request and payment of the necessary fee.

DETAILED DESCRIPTION

Figure 1:
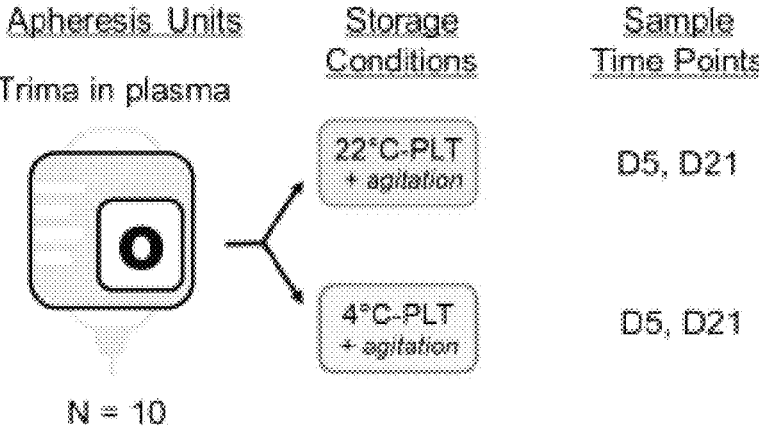
FIG. 1 shows a multidimensional assessment of platelet function with respect to changes in metabolism associated with cold storage.

The present disclosure is based, at least in part, on the discovery that supplementation with amino acids, such as taurine, allow for increased function of stored platelet. As shown herein, it was found that taurine levels were more strongly associated with platelet aggregation function, but when platelets were supplemented with taurine during storage, platelet aggregation surprisingly increased.

Platelets, also called thrombocytes (from Greek θρόμβοζ, "clot" and κὔτοζ, "cell"), are a component of blood whose function (along with the coagulation factors) is to react to bleeding from blood vessel injury by clumping, thereby initiating a blood clot. Platelets have no cell nucleus; they are fragments of cytoplasm that are derived from the megakaryocytes of the bone marrow, which then enter the circulation. Circulating unactivated platelets are biconvex discoid (lens-shaped) structures, 2-3 μm in greatest diameter. Activated platelets have cell membrane projections covering their surface. Platelets are found only in mammals, whereas in other vertebrates (e.g., birds, amphibians), thrombocytes circulate as intact mononuclear cells.

Platelet transfusion is most frequently used to correct unusually low platelet counts, either to prevent spontaneous bleeding (typically at counts below $10 \times 10^9/L$) or in anticipation of medical procedures that will necessarily involve some bleeding. For example, in patients undergoing surgery, a level below $50 \times 10^9/L$ is associated with abnormal surgical bleeding, and regional anesthetic procedures such as epidurals are avoided for levels below $80 \times 10^9/L$. Platelets may also be transfused when the platelet count is normal but the platelets are dysfunctional, such as when an individual is taking aspirin or clopidogrel. Finally, platelets may be transfused as part of a massive transfusion protocol, in which the three major blood components (red blood cells, plasma, and platelets) are transfused to address severe hemorrhage. Platelet transfusion is contraindicated in thrombotic thrombocytopenic purpura (TTP), as it fuels the coagulopathy.

Platelets are either isolated from collected units of whole blood and pooled to make a therapeutic dose, or collected by platelet apheresis: blood is taken from the donor, passed through a device which removes the platelets, and the remainder is returned to the donor in a closed loop. The industry standard is for platelets to be tested for bacteria before transfusion to avoid septic reactions, which can be fatal. Recently the AABB Industry Standards for Blood Banks and Transfusion Services (5.1.5.1) has allowed for use of pathogen reduction technology as an alternative to bacterial screenings in platelets.

Pooled whole-blood platelets, sometimes called "random" platelets, are separated by one of two methods. In the US, a unit of whole blood is placed into a large centrifuge in what is referred to as a "soft spin". At these settings, the platelets remain suspended in the plasma. The platelet-rich plasma (PRP) is removed from the red cells, then centrifuged at a faster setting to harvest the platelets from the plasma. In other regions of the world, the unit of whole blood is centrifuged using settings that cause the platelets to become suspended in the "buffy coat" layer, which includes the platelets and the white blood cells. The "buffy coat" is isolated in a sterile bag, suspended in a small amount of red blood cells and plasma, then centrifuged again to separate the platelets and plasma from the red and white blood cells. Regardless of the initial method of preparation, multiple donations may be combined into one container using a sterile connection device to manufacture a single product with the desired therapeutic dose.

Apheresis platelets are collected using a mechanical device that draws blood from the donor and centrifuges the collected blood to separate out the platelets and other components to be collected. The remaining blood is returned to the donor. The advantage to this method is that a single donation provides at least one therapeutic dose, as opposed to the multiple donations for whole-blood platelets. This means that a recipient is not exposed to as many different donors and has less risk of transfusion-transmitted disease and other complications. Sometimes a person such as a cancer patient who requires routine transfusions of platelets will receive repeated donations from a specific donor to further minimize the risk. Pathogen reduction of platelets using for example, riboflavin and UV light treatments can also be carried out to reduce the infectious load of pathogens contained in donated blood products, thereby reducing the risk of transmission of transfusion-transmitted diseases. Another photochemical treatment process utilizing amotosalen and UVA light has been developed for the inactivation of viruses, bacteria, parasites, and leukocytes that can contaminate blood components intended for transfusion. In addition, apheresis platelets tend to contain fewer contaminating red blood cells because the collection method is more efficient than "soft spin" centrifugation at isolating the desired blood component.

Platelets collected by either method have a very short shelf life, typically five days. This results in frequent problems with short supply, as testing the donations often requires up to a full day. Since there are no effective preservative solutions for platelets, they lose potency quickly and are best when fresh.

Platelets are stored under constant agitation at 20-24° C. (68-75.2° F.). Currently, units cannot be refrigerated as this causes platelets to change shape and lose function. Storage at room temperature provides an environment where any bacteria that are introduced to the blood component during the collection process may proliferate and subsequently cause bacteremia in the patient. Regulations are in place in the United States that require products to be tested for the presence of bacterial contamination before transfusion.

Platelets do not need to belong to the same A-B-O blood group as the recipient or be cross-matched to ensure immune compatibility between donor and recipient unless they contain a significant amount of red blood cells (RBCs). The presence of RBCs imparts a reddish-orange color to the product, and is usually associated with whole-blood platelets. An effort is sometimes made to issue type-specific platelets, but this is not critical as it is with RBCs.

Prior to issuing platelets to the recipient, they may be irradiated to prevent transfusion-associated graft versus host disease or they may be washed to remove the plasma if indicated.

The change in the recipient's platelet count after transfusion is termed the "increment" and is calculated by subtracting the pre-transfusion platelet count from the post-transfusion platelet count. Many factors affect the increment including the recipient's body size, the number of platelets transfused, and clinical features that may cause premature destruction of the transfused platelets. When recipients fail to demonstrate an adequate post-transfusion increment, this is termed platelet transfusion refractoriness.

Platelets, either apheresis-derived or random-donor, can be processed through a volume reduction process. In this process, the platelets are spun in a centrifuge and the excess plasma is removed, leaving between about 10 mL to about 100 mL of platelet concentrate. Such volume-reduced platelets are normally transfused only to neonatal and pediatric patients when a large volume of plasma could overload the child's small circulatory system. The lower volume of plasma also reduces the chances of an adverse transfusion reaction to plasma proteins. Volume-reduced platelets can have a shelf life of only four hours.

Platelets release platelet-derived growth factor (PDGF), a potent chemotactic agent; and TGF beta, which stimulates the deposition of extracellular matrix; fibroblast growth factor, insulin-like growth factor 1, platelet-derived epidermal growth factor, and vascular endothelial growth factor. Local application of these factors in increased concentrations through platelet-rich plasma (PRP) is used as an adjunct in wound healing.

In one embodiment, the disclosure provides a platelet solution (e.g., a resuspension solution and/or storage solution), comprising an aqueous solution and an amino acid effective to improve or preserve platelet function. In certain embodiments, the amino acid is taurine or a functional variant thereof.

Taurine (2-aminoethanesulfonic acid) is a semi-essential and the most abundant free amino acid in the human body, with a six times higher concentration in platelets than any other amino acid. Taurine has been repeatedly reported to elicit an inhibitory action on platelet activation and aggregation, sustained by in vivo, ex vivo, and in vitro animal and human studies. Taurine is naturally derived from cysteine. Mammalian taurine synthesis occurs in the pancreas via the cysteine sulfinic acid pathway. In this pathway, cysteine is first oxidized to its sulfinic acid, catalyzed by the enzyme cysteine dioxygenase. Methods to synthesize taurine and derivatives thereof (e.g., substituted taurine and N-acylated derivates) are known in the art, see e.g., CN101255126B and US20160206579A1, the disclosures of which are incorporated herein by reference in their entirety.

As used herein, "taurine derivatives" encompass substances that are structurally close to taurine but possess at least one structural difference, such as one or more chemical changes, e.g. at least one replacement of an atom or a chemical group found in taurine by a distinct atom or a distinct chemical group.

As used herein, "taurine analogs" encompass substances that are chemically distinct from taurine but which exert the same biological activity.

In a particular embodiment, taurine derivatives are selected from different entities including the group consisting of acetylhomotaurinate, and piperidino-, benzamido-, phthalimido- or phenylsuccinylimido taurine derivatives. Such taurine derivatives are described notably by Kontro et al. (1983) and by Andersen et al. (1984). Derivatives include for instance taurolidine (4,4'-methylene-bis(tetrahydro-2H-1,2,4-thiadiazine-1,1-dioxide or taurolin), taurultam and taurinamide, chlorohydrate-N-isopropylamide-2-(1-phenylethyl)amino ethanesulfonic acid.

In some embodiments, the disclosure provides a platelet solution in a pH in the range of from about 4 to about 6, preferably in the range from about 5 to about 5.5. In a preferred embodiment, the platelet solution comprises a sterilizable solution.

In another embodiment, the invention provides a platelet solution, comprising an aqueous solution having a pH in the range of from about 6.6 to about 7.8, preferably in the range of from about 6.8 to about 7.4. In a preferred embodiment, the buffer comprises sodium bicarbonate.

In addition to an amino acid effective to improve or preserve platelet function, a platelet solution according to the disclosure may further comprise acetate, potassium, magnesium, phosphate, bicarbonate, calcium, citrate, gluconate, glucose, sodium chloride, and/or combinations thereof.

Without being limited to any particular mechanism, it is believed the presence of an amino acid such as taurine in the platelet solutions of the disclosure improves, increases, or preserves platelet function promotes platelet aggregation, stabilizes platelet mitochondria, increases shelf-life, compared to platelet solutions not supplemented with an amino acid.

Typically, the platelet solution also includes electrolytes for ionic balance. For example, preferred embodiments of the solution(s) include at least one of, and preferably, at least two of, sodium chloride (for example, physiological saline solution), potassium chloride, and magnesium chloride, as these electrolytes are more natural to the human body (e.g., as they are more similar to those electrolytes found in plasma).

The platelet solution can also include additional components such as, for example, phosphate and/or citric acid.

Typically, the platelet resuspension and/or platelet storage solution has an osmolarity in the range of from about 260 to about 380 mOsm/L, preferably, in the range of from about 280 to about 320 mOsm/L, as measured in accordance with U.S. Pharmacopeia (USP) 24-NF19.

In accordance with an embodiment of a platelet resuspension solution according to the disclosure, the solution has a pH in the range of from about 4 to about 6, preferably, in the range of from about 4.6 to about 5.7, even more preferably, in the range from about 5 to about 5.7. In preferred embodiment, the platelet resuspension solution is a sterilizable solution, more preferably, a steam sterilizable solution.

In accordance with an embodiment of a platelet storage solution according to the invention, the solution has a pH in the range of from about 6.6 to about 7.8, preferably, in the range of from about 6.8 to about 7.4. Typically, at a temperature in the range of from about 22° C. to about 24° C., the solution has a pH in the range of from about 6.8 to about 7.6, and at a temperature in the range of from about 27° C. to about 39° C., the solution typically has a pH in the range of from about 7 to about 7.8.

Typical embodiments of platelet resuspension and/or platelet storage solutions include concentrations in the range of from about 10 to about 45 mM glucose, about 6 to about 10 mM sodium citrate, and 0 to about 25 mM sodium acetate. In those embodiments also including electrolytes, the solution(s) typically include at least one, and more preferably, each of the following, in the following concentration(s): in the range of from about 3 to about 7 mM potassium chloride, about 1 to about 5 mM magnesium chloride, and about 70 to about 130 mM sodium chloride. The solution(s) may also include, for example, in the range of from 0 to about 5 mM citric acid and/or in the range of about 3.5 to about 7 mM sodium phosphate (in some embodiments, in the range of about 3.5 to about 4.5 mM sodium phosphate). The solution(s) include concentrations of an amino acid (e.g. taurine) in the range from about 250 µM to about 1000 µM.

Preferred embodiments of platelet resuspension and/or platelet storage solutions include concentrations in the range of from about 350 µM to about 800 µM of an amino acid (e.g. taurine), about 15 to about 30 mM glucose, about 7 to about 9 mM sodium citrate, and 8 to about 18 mM sodium acetate. In those embodiments also including electrolytes, the solution(s) typically include at least one, and more preferably, each of the following in the following concentration(s): in the range of from about 3 to about 5 mM potassium chloride, about 2 to about 4 mM magnesium chloride, and about 80 to about 120 mM sodium chloride.

The solution(s) may also include, for example, citric acid having a concentration in the range of from 1 to about 4 mM and/or sodium phosphate having a concentration in the range of about 3 to about 6.5 mM.

In those embodiments wherein the platelet resuspension solution includes citric acid and sodium citrate, the mM ratio of citric acid/sodium citrate is preferably in the range of from about 0.1 to about 0.5.

With respect to a buffer, e.g., as included in the platelet storage solution, a preferred buffer is sodium bicarbonate, in a concentration in the range of from about 5 to about 20 mM, more preferably in the range of from about 8 to about 15 mM. In accordance with preferred embodiments of the disclosure, the buffering material is sterilized before it is utilized in forming an embodiment of the platelet storage solution or before it is added to a platelet-containing resuspension solution.

A platelet processing system according to an embodiment of the disclosure comprises a flexible bag and the platelet resuspension solution as described above contained in the bag. In some embodiments, the flexible bag is suitable for containing a platelet- and platelet resuspension-containing solution.

In yet another embodiment, a platelet storage system is provided, comprising a flexible bag suitable for containing (preferably, for storing) a platelet-containing solution, the bag being a gas permeable bag, and further comprising a buffering material. In some embodiments of the system, the bag contains the buffering material, or the system further comprises a compartment communicating with the flexible bag, wherein the compartment, preferably a squeezable compartment, contains the buffering material. In an embodiment of the system, the bag contains the platelet storage solution as described above therein.

In another embodiment, a biological fluid processing system is provided, comprising the platelet processing system as described above, and at least one, and preferably, at least two, additional flexible bags. In a more preferred embodiment, at least one of the additional flexible bags comprises a gas permeable bag.

In another embodiment, a biological fluid processing system comprises the platelet processing system as described above, and an apheresis bowl, chamber, or tube, suitable for containing a platelet-containing biological fluid. The system can include at least one additional container, e.g., a flexible, gas permeable bag.

In accordance with the disclosure, platelets can be effectively resuspended in the platelet resuspension solution (in some embodiments, resuspended in the platelet storage solution) while improving, increasing, or preserving platelet function, promoting platelet aggregation, stabilizing platelet mitochondria, and/or increasing shelf-life, compared to platelets resuspended in a solution not supplemented with an amino acid, thus increasing the yield of valuable platelets for transfusion. Moreover, the platelets can be stored while maintaining high platelet quality, thus providing a high yield of useable platelets for transfusion.

Typically, the platelet resuspension solution and/or platelet storage solution is essentially free of photoactive agents (e.g., photosensitizers for use in inactivating microorganisms). However, the solution(s) can be used with photosensitizers, and, in microorganism inactivation protocols such as viral inactivation protocols, the presence of less plasma allows less inactivation agent (e.g., psoralens such as methylene blue), or a lower dose of the inactivation agent (e.g., UV light) to be utilized during the protocol. Thus, there can be less inactivation agent to be subsequently removed and/or platelet damage can be reduced.

In accordance with preferred embodiments of a method according to the disclosure, a platelet-containing biological fluid (e.g., comprising apheresis platelets, platelets obtained from platelet-rich-plasma or platelets obtained from pooled buffy coats), is combined with a platelet resuspension solution to form a platelet-containing platelet resuspension solution, and the platelets are resuspended in the solution. In some embodiments, e.g., some apheresis systems, the platelet resuspension solution comprises an elutriation solution. The platelet-containing platelet resuspension solution is further processed, which includes adding a buffer, and the buffered platelet-containing fluid is stored in a container (preferably a gas permeable flexible bag) for a desired period of time before further use, e.g., as a transfusion product that is administered to a patient.

Embodiments of the method can include pooling two or more volumes of platelet-containing fluid (e.g., two or more units of buffy coat), and mixing pooled platelet-containing fluid with a platelet-resuspension solution to provide a pooled platelet-containing platelet resuspension solution. For example, in one embodiment, 4-6 units of whole blood are each processed to provide sedimented red cells, buffy coat, and platelet-poor-plasma (PPP), and the components are separated. As explained above, in preferred embodiments, a greater volume of PPP can be removed when separating the PPP from the buffy coat, as the PPP is not needed to provide glucose. The buffy coats (the platelet-containing fluid) from each unit of whole blood are pooled, the pooled platelet-containing fluid is mixed with a platelet resuspension solution, and the platelets are re-suspended in the resuspension solution. The fluid is further processed so that platelets can be prepared for storage. For example, further processing includes adding a buffering material (typically after centrifugation and separation of biological fluid components), and the resultant supernatant pooled platelet-containing fluid can subsequently be separated from the sedimented red and white blood cells. The separated pooled platelet-containing fluid (containing the buffered resuspension solution, thus forming an embodiment of the storage solution), can be stored as described above before further use.

In one embodiment that does not include pooling, a unit of whole blood is centrifuged to form supernatant platelet-rich-plasma (PRP) and sedimented packed red blood cells, and the PRP is expressed to, for example, a container such as a blood bag, e.g., a plasticized satellite bag. The PRP is subsequently centrifuged to concentrate the platelets at the bottom of the bag, and the supernatant plasma is expressed from the bag. As explained above, in preferred embodiments, a greater volume of plasma can be removed when separating the plasma from the concentrated platelets, as this plasma is not needed to provide glucose. After the plasma is removed, platelet resuspension solution (e.g., about 40 to about 50 ml) is added to the bag, and the platelets are resuspended in the resuspension solution. In some embodiments, the platelets are resuspended in the resuspension solution after the platelets have rested unagitated for a period of time, for example, about 1-2 hours. Subsequently, a buffer is added, thus forming an embodiment of the storage solution, and the buffered, platelet-containing solution can be stored as described above before further use.

In another embodiment, after the PRP is centrifuged and the supernatant plasma is removed as described above, non-platelet containing buffered platelet storage solution (e.g., about 40 to about 50 ml of the solution) is added to the bag, and the platelets are (in some embodiments, after the platelets have rested unagitated for a period of time) resuspended in the buffered storage solution, and can be stored in the solution.

In accordance with another embodiment that does not include pooling, e.g., wherein the biological fluid is processed in an apheresis system, concentrated platelets are prepared using the apheresis system (e.g., including, but not limited to, an apheresis system such as a Baxter Fenwall Amicus® Separator or a Baxter Fenwall CS 3000 plus) in a container (e.g., a collection chamber), and an embodiment of the resuspension solution (e.g., about 100 to about 300 ml for single product platelets) is added to the concentrated platelet fluid, preferably, without adding plasma to the concentrated platelet fluid. The platelets are resuspended in the resuspension solution (in some embodiments, the platelets are resuspended after the platelets have rested unagitated for a period of time). Subsequently, a buffer is added, thus forming the storage solution, and the buffered, platelet-containing solution can be stored as described above before further use.

In another embodiment, after concentrated platelets are prepared using the apheresis system in a container (e.g., a collection chamber) as described above, an embodiment of the non-platelet containing buffered storage solution (e.g., about 100 to about 300 ml of the solution for single product platelets) is added to the concentrated platelet fluid, preferably, without adding plasma to the concentrated platelet fluid. The platelets are (in some embodiments, after the platelets have rested unagitated for a period of time) resuspended in the buffered storage solution, and can be stored in the solution.

In preferred embodiments of the disclosure, leukocytes are depleted from the platelets. For example, a platelet-containing fluid, that can be prepared, for example, in an apheresis system or from a donated unit of whole blood, e.g., PRP, buffy coat, or the supernatant layer comprising platelets formed after pooled buffy coats are centrifuged, can be passed through a leukocyte depletion filter (preferably a leukocyte depletion filter including a leukocyte depletion- and red cell barrier-medium) to provide leukocyte-depleted platelets. A platelet-containing fluid can be leukocyte-depleted before forming the platelet-containing platelet resuspension solution, or before forming a platelet-containing storage solution, or after forming the platelet-containing platelet resuspension solution, but before adding a buffer. Preferably, a platelet-containing fluid is filtered before a buffer is added to the fluid.

In those embodiments wherein a platelet-containing fluid is combined with a buffered platelet storage solution (e.g., some embodiments wherein PRP is centrifuged and the supernatant plasma is removed, and the buffered platelet storage solution is mixed with the* concentrated platelets), platelets are preferably filtered before a platelet-containing fluid is combined with a buffered platelet storage solution.

A typical embodiment of the method further comprises storing the buffered platelet-containing solution (preferably, wherein the platelets have been leukocyte-depleted) in the container for at least 2 days, preferably, at least 5 days, and in some embodiments, at least 7 days, at least 14 days or at least 21 days. Preferably, the pH of the fluid is maintained within the range of about 6.8 to about 7.4 during the storage period, more preferably, wherein the fluid is stored in a gas permeable flexible bag. In some embodiments, isolated platelets are stored in the platelet solution of the disclosure at room temperature or at about between 0 and 8 degrees Celsius.

If desired, a preferred embodiment of the method further comprises administering platelets to a patient.

In accordance with current U.S. practice, platelet-containing biological fluids prepared in closed systems (with or without additive solutions) can be stored for 5 days before use, e.g., as transfusion products, and platelets processed according to the disclosure can be stored for that period of time. However, platelets produced in accordance with embodiments of the disclosure can remain viable for longer periods of time, e.g., they remain viable after 7 days of storage, after 10 days of storage, after 14 days of storage and even after 21 days of storage. Accordingly, should the regulations in the U.S., or any other country be changed, embodiments of the invention allow for platelet storage for longer than 5 days, e.g., up to about 7 days or more, or 10 days, or 14 days, or 21 days, or more.

The viability of the platelets can be determined by a variety of methods known in the art. Typically, in determining viability, at least one, and more preferably, two or more, of the following are evaluated: platelet count, pH, $pO_2$, $pCO_2$, bicarbonate, streaming (or swirling), hypotonic shock response (% HSR), extent of shape change (% ESC), %>discs (platelet morphology), CD62 level (p-selectin), plasma glucose, plasma lactate, ATP level, and in vivo radiolabeling studies.

A variety of containers, preferably flexible blood bags, are suitable for use in accordance with the invention. The containers should be sterilizable in accordance with conventional protocols, e.g., at least one of steam sterilization, gamma sterilization, and ethylene oxide sterilization.

In some embodiments, the platelets can be resuspended in the platelet resuspension solution in one container (for example, in the collection chamber of an apheresis system, or in a flexible blood bag), and the buffered platelet-containing solution can be formed in another container, for example. Typically, the container utilized for storing the platelets (that may be the container in which the buffered platelet storage solution is formed) is a gas permeable container, e.g., a container allowing suitable gas transmission into and/or out of the interior volume of the container.

Examples of suitable flexible containers, wherein the containers are gas permeable, include, but are not limited to, polyolefm elastomer bags as described in International Publication No. WO 02065976, bags prepared from a film comprising ultra high molecular weight plasticized PVC as described in U.S. Pat. No. 5,721,024, and bags prepared from a film comprising plasticized PVC as described in U.S. Pat. No. 4,280,497.

Preferably, the polymeric film used in manufacturing gas permeable bags has a 22° C. room air oxygen transmission of about 12 µmoles or greater O/hr/350 $cm^2$ film surface area. In some embodiments, the 22° C. room air oxygen transmission is 15 µmoles or greater $O_2$/hr/350 $cm^2$ film surface area, preferably, about 18 µmoles or greater $O_2$/hr/ 350 cm film surface area, and even more preferably, about 20 µmoles or greater $O_2$/hr/350 $cm^2$ film surface area.

The containers used in accordance with some embodiments are also resilient to temperature fluctuations, e.g., they can withstand low temperatures during freezing, e.g., when processing plasma.

In some embodiments, at least one container, e.g., wherein the container comprises a gas permeable container, is free of, or essentially free of, plasticizers such as di (2-ethylhexyl) phthalate (DEHP), tri (2-ethylhexyl) trimellitate (TOTM), and citrate ester plasticizers such as n-butryl tri-n-hexyl citrate (BTHC). However, one or more containers (e.g., the polymeric film) can include modifiers and/or additives such as, for example, at least one of an antistatic, antiblock, a stabilizer, and antioxidant, e.g., for use in processing the film for making the containers.

As described in International Publication No. WO 02065976, a resin is used in producing the polymeric film used in manufacturing a polyolefm elastomer bag and the resin comprises at least one copolymer comprising ethylene and an acrylate, preferably comprising ethylene and an alkyl acrylate. The resin can comprise a plurality of copolymers, e.g., a blend comprising a first copolymer comprising ethylene and a first alkyl acrylate, and a second copolymer comprising ethylene and a second alkyl acrylate.

In some embodiments, the copolymer comprises ethylene and at least about 20 weight percent alkyl acrylate based upon the combined weight of the ethylene and the alkyl acrylate. For example, the copolymer can comprise ethylene and at least about 22 weight percent alkyl acrylate, or ethylene and at least about 24 weight percent alkyl acrylate. The term "alkyl" herein refers to an alkyl group having from 1 to about 10 carbon atoms, preferably from 1 to about 6 carbon atoms, and more preferably from 1 to about 4 carbon atoms. In even more preferred embodiments, the alkyl acrylate is methyl acrylate or butyl acrylate. For example, the resin can comprise a copolymer comprising ethylene, and at least about 20 wt. % methyl acrylate or at least about 20 wt. %>butyl acrylate. In other embodiments, the resin comprises a copolymer comprising ethylene, and at least about 22 wt. % methyl acrylate or at least about 22 wt. %>butyl acrylate, or ethylene and at least about 24 wt. % methyl acrylate or at least about 24 wt. %>butyl acrylate.

Suitable resins include, for example, resins commercially available from, for example, Eastman Chemical Company (Kingsport, TN), Atofina Chemicals, Inc. (Philadelphia, PA) and Dupont (Wilmington, DE). For example, a variety of resins commercially available from Eastman Chemical Company referred to as EMAC® (including EMAC+®), EBAC® (including EBAC+®), and EMAC/EBAC® are suitable. Illustrative examples of such resins are ethylene butyl acrylate copolymer (EBAC) resin, e.g., EBAC SP1802 and SP1903 specialty copolymers, and ethylene methyl acrylate copolymer (EMAC) resin, e.g., EMAC SP1305, SP1307, SP1330, SP1400, SP2202, SP2207, SP2220, SP2260 and SP2268, specialty copolymers. Illustrative suitable resins commercially available from Atofina Chemicals, Inc., include, for example, those resins referred to as LOTRYL™ resins (e.g., LOTRYL™ EBA and LOTRYL™ EMA) and illustrative suitable resins commercially available from DuPont include, for example, those resins referred to as ELVALOY™ resins (e.g., ELALOY™ AC).

As described in U.S. Pat. No. 5,721,024, a flexible container can comprise a polyvinyl chloride (PVC) film manufactured from a polyvinyl chloride compound, said compound comprising an ultra high molecular weight polyvinyl chloride resin having an inherent viscosity ranging from about 1.25 to about 2.00, as measured by ASTM D-1243; and about 43 weight percent or more (typically, in the range of from about 43 to about 57 weight percent) of a plasticizer. Preferably, the plasticizer is one from the group of plasticizers consisting of: tri (2-ethylhexyl) trimellitate; di-(2-ethylhexyl) phthalate; acetyl tri-n-butyl citrate; n-butyryl tri-n-hexyl citrate; acetyl tri-n-octyl citrate; and acetyl tri-n-decyl citrate.

The bags according to the disclosure can have any suitable size, shape, internal volume and/or thickness. The bags can be made from the polymeric film and resin described herein using conventional techniques known and used in the industry. Illustratively, the bag can be arranged from a single sheet of sheet of film (e.g., folded over at the end where the ports are arranged and sealed around the other edges), two sheets of film, from a collapsed blown bubble of film (sometimes referred to as "lay flat tubing"), and the like. The bags are typically extruded, but can be blow molded or formed by other appropriate methods known in the art.

The preferred wall thickness of gas permeable containers for storing platelet-containing fluids using the polymeric film can be in the conventional range of about 0.005 to about 0.025 inch (about 0.13 to about 0.64 mm), preferably about 0.010 inch to about 0.018 inch (about 0.25 to about 0.46 mm), with about 0.012 to about 0.015 inch (about 0.30 to about 0.38 mm) being most preferred. This wall thickness results in containers having sufficient tensile strength to withstand conventional use in the collection and processing of blood and blood components.

In typical embodiments of gas permeable containers according to the invention, each side wall is a single layer of film.

In a preferred embodiment, the gas permeable bag is configured to allow at least one material (e.g., a dry material, or a liquid), more preferably, a buffering material, even more preferably a buffer that can be subjected to sterilization conditions without substantial degradation, to be mixed with a fluid, e.g., the platelet-containing platelet resuspension solution mixture, or a non-platelet containing resuspension solution, in the bag. The material can be present (e.g., as a tablet) in the interior volume of the bag, e.g., so that the platelet-containing platelet resuspension solution mixture contacts the material when the solution mixture is passed into the bag.

Alternatively, gas permeable container can include at least two compartments, e.g., a larger compartment for containing a platelet-containing platelet resuspension solution mixture, and at least one smaller compartment containing the material wherein the bag is arranged to allow the material in the smaller compartment to be passed to the larger compartment. In yet another embodiment, an additional container is arranged so that material from the additional container can be passed into the container containing the platelet-containing platelet resuspension solution mixture. Typically, the smaller compartment or the additional container is adapted to contain a buffer. Between the smaller compartment and the larger compartment, and between the additional container and the gas permeable container, is a closure means, preferably an externally manipulable closure means (in some embodiments, an in-line frangible valve), that allows the buffer to be mixed with the platelet-containing platelet resuspension solution mixture when desired. In one embodiment, the gas permeable bag includes at least two compartments as disclosed in U.S. Pat. Nos. 4,902,287 and 4,994,057, wherein at least one smaller compartment is squeezable, i.e., the smaller compartment comprises a resilient material that causes the compartment to generally return to its original shape after it has been deformed by external pressure on the compartment walls.

While a variety of buffers are suitable for use in accordance with the invention, a preferred material is sodium bicarbonate. The buffering material is preferably in dry form, e.g., in powder or tablet form. As noted above, preferably, the buffer can be subjected to sterilization conditions without substantial degradation.

A variety of leukocyte depletion filters comprising leukocyte media are suitable for use in according to the invention. Alternatively, or additionally, in some embodiments, the leukocyte depletion filter comprises a red cell barrier medium, or a combined red cell barrier leukocyte depletion medium. Suitable filters and media include, but are not limited to, those disclosed in U.S. Pat. Nos. 4,880,548, 5,100,564, 5,152,905, 5,472,621 and 5,670,060.

A biological fluid includes any treated or untreated fluid associated with living organisms, particularly blood, including whole blood, warm or cold blood, and stored or fresh blood; treated blood, such as blood diluted with at least one physiological solution, including but not limited to saline, nutrient, and/or anticoagulant solutions; blood components, such as platelet concentrate (PC), platelet-rich plasma (PRP), platelet-poor plasma (PPP), platelet-free plasma, plasma, fresh frozen plasma (FFP), components obtained from plasma, packed red cells (PRC), transition zone material or buffy coat (BC); blood products derived from blood or a blood component or derived from bone marrow; stem cells; red cells separated from plasma and resuspended in physiological fluid or a cryoprotective fluid; and platelets separated from plasma and resuspended in physiological fluid or a cryoprotective fluid. The biological fluid may have been treated to remove some of the leukocytes before being processed according to the invention. As used herein, blood product or biological fluid refers to the components described above, and to similar blood products or biological fluids obtained by other means and with similar properties. In some embodiments, the biological fluid contains platelets which have been separated from whole blood.

A "unit" is the quantity of biological fluid from a donor or derived from one unit of whole blood. It may also refer to the quantity drawn during a single donation. Typically, the volume of a unit varies, the amount differing from patient to patient and from donation to donation. Multiple units of some blood components, particularly platelets and buffy coat, may be pooled or combined, typically by combining four or more units.

As used herein, the term "closed" refers to a system that allows the collection and processing (and, if desired, the manipulation, e.g., separation of portions, separation into components, filtration, storage, and preservation) of biological fluid, e.g., donor blood, blood samples, and/or blood components, without the need to compromise the sterile integrity of the system. A closed system can be as originally made, or result from the connection of system components using what are known as "sterile docking" devices. Illustrative sterile docking devices are disclosed in U.S. Pat. Nos. 4,507,119, 4,737,214, and 4,913,756.

Sterilizable preferably means the capability of being subjected to temperatures of at least about 114° C. for at least about 30 minutes (or exposed to at least about 2.5 megarads of gamma radiation) without significant degradation of a given product. In the case of dry or liquid compounds, chemicals, or components, such compounds, chemicals and components preferably retain at least about 75% by weight of their initial pre-sterilization chemical identity and utility after having been subjected to the above sterilization conditions.

Agents and compositions described herein can be administered according to methods described herein in a variety of means known to the art. The agents and composition can be used therapeutically either as exogenous materials or as endogenous materials. Exogenous agents are those produced or manufactured outside of the body and administered to the body. Endogenous agents are those produced or manufactured inside the body by some type of device (biologic or other) for delivery within or to other organs in the body.

As discussed above, administration can be parenteral, pulmonary, oral, topical, intradermal, intratumoral, intranasal, inhalation (e.g., in an aerosol), implanted, intramuscular, intraperitoneal, intravenous, intrathecal, intracranial, intracerebroventricular, subcutaneous, intranasal, epidural, intrathecal, ophthalmic, transdermal, buccal, and rectal.

Agents and compositions described herein can be administered in a variety of methods well known in the arts. Administration can include, for example, methods involving oral ingestion, direct injection (e.g., systemic or stereotactic), implantation of cells engineered to secrete the factor of interest, drug-releasing biomaterials, polymer matrices, gels, permeable membranes, osmotic systems, multilayer coatings, microparticles, implantable matrix devices, mini-osmotic pumps, implantable pumps, injectable gels and hydrogels, liposomes, micelles (e.g., up to 30 μm), nanospheres (e.g., less than 1 μm), microspheres (e.g., 1-100 μm), reservoir devices, a combination of any of the above, or other suitable delivery vehicles to provide the desired release profile in varying proportions. Other methods of controlled-release delivery of agents or compositions will be known to the skilled artisan and are within the scope of the present disclosure.

Delivery systems may include, for example, an infusion pump which may be used to administer the agent or composition in a manner similar to that used for delivering insulin or chemotherapy to specific organs or tumors. Typically, using such a system, an agent or composition can be administered in combination with a biodegradable, biocompatible polymeric implant that releases the agent over a controlled period of time at a selected site. Examples of polymeric materials include polyanhydrides, polyorthoesters, polyglycolic acid, polylactic acid, polyethylene vinyl acetate, and copolymers and combinations thereof. In addition, a controlled release system can be placed in proximity of a therapeutic target, thus requiring only a fraction of a systemic dosage.

Agents can be encapsulated and administered in a variety of carrier delivery systems. Examples of carrier delivery systems include microspheres, hydrogels, polymeric implants, smart polymeric carriers, and liposomes (see generally, Uchegbu and Schatzlein, eds. (2006) Polymers in Drug Delivery, CRC, ISBN-10: 0849325331). Carrier-based systems for molecular or biomolecular agent delivery can: provide for intracellular delivery; tailor biomolecule/agent release rates; increase the proportion of biomolecule that reaches its site of action; improve the transport of the drug to its site of action; allow colocalized deposition with other agents or excipients; improve the stability of the agent in vivo; prolong the residence time of the agent at its site of action by reducing clearance; decrease the nonspecific delivery of the agent to nontarget tissues; decrease irritation caused by the agent; decrease toxicity due to high initial doses of the agent; alter the immunogenicity of the agent; decrease dosage frequency; improve taste of the product; or improve shelf life of the product.

Also provided are kits. Such kits can include an agent or composition described herein and, in certain embodiments, instructions for administration. Such kits can facilitate performance of the methods described herein. When supplied as a kit, the different components of the composition can be packaged in separate containers and admixed immediately before use. Components include, but are not limited to the supplement mixture, storage containers comprising the supplement, amino acids or derivatives or variants thereof, taurine, acetate, potassium, magnesium, phosphate, bicarbonate, calcium, citrate, gluconate, glucose, sodium chloride, or combinations thereof. Such packaging of the components separately can, if desired, be presented in a pack or dispenser device which may contain one or more unit dosage forms containing the composition. The pack may, for example, comprise metal or plastic foil such as a blister pack. Such packaging of the components separately can also, in certain instances, permit long-term storage without losing activity of the components.

Kits may also include reagents in separate containers such as, for example, sterile water or saline to be added to a lyophilized active component packaged separately. For example, sealed glass ampules may contain a lyophilized component and in a separate ampule, sterile water, sterile saline each of which has been packaged under a neutral non-reacting gas, such as nitrogen. Ampules may consist of any suitable material, such as glass, organic polymers, such as polycarbonate, polystyrene, ceramic, metal, or any other material typically employed to hold reagents. Other examples of suitable containers include bottles that may be fabricated from similar substances as ampules and envelopes that may consist of foil-lined interiors, such as aluminum or an alloy. Other containers include test tubes, vials, flasks, bottles, syringes, and the like. Containers may have a sterile access port, such as a bottle having a stopper that can be pierced by a hypodermic injection needle. Other containers may have two compartments that are separated by a readily removable membrane that upon removal permits the components to mix. Removable membranes may be glass, plastic, rubber, and the like.

In certain embodiments, kits can be supplied with instructional materials. Instructions may be printed on paper or another substrate, and/or may be supplied as an electronic-readable medium or video. Detailed instructions may not be physically associated with the kit; instead, a user may be directed to an Internet website specified by the manufacturer or distributor of the kit.

Compositions and methods described herein utilizing molecular biology protocols can be according to a variety of standard techniques known to the art (see e.g., Sambrook and Russel (2006) Condensed Protocols from Molecular Cloning: A Laboratory Manual, Cold Spring Harbor Laboratory Press, ISBN-10: 0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10: 0879695773; Elhai, J. and Wolk, C. P. 1988. Methods in Enzymology 167, 747-754; Studier (2005) Protein Expr Purif. 41(1), 207-234; Gellissen, ed. (2005) Production of Recombinant Proteins: Novel Microbial and Eukaryotic Expression Systems, Wiley-VCH, ISBN-10: 3527310363; Baneyx (2004) Protein Expression Technologies, Taylor & Francis, ISBN-10: 0954523253).

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

As used herein, the term "consisting essentially of" takes it's well established meaning and is generally construed to mean that the composition or formulation (a) necessarily includes the listed ingredients and (b) is open to unlisted ingredients that do not materially affect the basic and novel properties of the composition (e.g. resulting in high-recovery yields of cryopreserved SC-islets; improved islet health resulting in improved function; high-recovery yield of resized SC-islets; improved cell recovery and clustering morphology; improved gene expression for SC Islets and maintains Beta cell identity; maintenance of C-peptide and NKX6-1; increase in INS or MAFA gene expression; or maintain insulin expression after thaw relative to standard techniques).

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

General Techniques

The practice of the present disclosure will employ, unless otherwise indicated, conventional techniques of molecular biology (including recombinant techniques), microbiology, cell biology, biochemistry, and immunology, which are within the skill of the art. Such techniques are explained fully in the literature, such as Molecular Cloning: A Laboratory Manual, second edition (Sambrook, et al., 1989) Cold Spring Harbor Press; Oligonucleotide Synthesis (M. J. Gait, ed. 1984); Methods in Molecular Biology, Humana Press; Cell Biology: A Laboratory Notebook (J. E. Cellis, ed., 1989) Academic Press; Animal Cell Culture (R. I. Freshney, ed. 1987); Introuction to Cell and Tissue Culture (J. P. Mather and P. E. Roberts, 1998) Plenum Press; Cell and Tissue Culture: Laboratory Procedures (A. Doyle, J. B. Griffiths, and D. G. Newell, eds. 1993-8) J. Wiley and Sons; Methods in Enzymology (Academic Press, Inc.); Handbook of Experimental Immunology (D. M. Weir and C. C. Blackwell, eds.): Gene Transfer Vectors for Mammalian Cells (J. M. Miller and M. P. Calos, eds., 1987); Current Protocols in Molecular Biology (F. M. Ausubel, et al. eds. 1987); PCR: The Polymerase Chain Reaction, (Mullis, et al., eds. 1994); Current Protocols in Immunology (J. E. Coligan et al., eds., 1991); Short Protocols in Molecular Biology (Wiley and Sons, 1999); Immunobiology (C. A. Janeway and P. Travers, 1997); Antibodies (P. Finch, 1997); Antibodies: a practice approach (D. Catty., ed., IRL Press, 1988-1989); Monoclonal antibodies: a practical approach (P. Shepherd and C. Dean, eds., Oxford University Press, 2000); Using antibodies: a laboratory manual (E. Harlow and D. Lane (Cold Spring Harbor Laboratory Press, 1999); The Antibodies (M. Zanetti and J. D. Capra, eds. Harwood Academic Publishers, 1995); DNA Cloning: A practical Approach, Volumes I and II (D. N. Glover ed. 1985); Nucleic Acid Hybridization (B. D. Hames & S. J. Higgins eds. (1985»; Transcription and Translation (B. D. Hames & S. J. Higgins, eds. (1984»; Animal Cell Culture (R. I. Freshney, ed. (1986»; Immobilized Cells and Enzymes (IRL Press, (1986»; and B. Perbal, A practical Guide To Molecular Cloning (1984); F. M. Ausubel et al. (eds.).

Without further elaboration, it is believed that one skilled in the art can, based on the above description, utilize the present invention to its fullest extent. The following specific embodiments are, therefore, to be construed as merely illustrative, and not limitative of the remainder of the disclosure in any way whatsoever. All publications cited herein are incorporated by reference for the purposes or subject matter referenced herein.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1: Taurine as a Storage Supplement for Platelet Concentrates

The present example provides the use of amino acids (specifically taurine) as a supplement in platelet storage solutions to improve platelet concentrate function and elongate platelet concentrate shelf life.

The present data suggest that taurine supplementation during platelet concentrate storage robustly increases hemostatic function under physiologically relevant flow. In improvement over the commercially available platelet storage solutions, as none have been observed to have this effect. Indeed, currently available platelet storage solutions (platelet additive solutions, PAS) contain varying compositions of the following: acetate, potassium, magnesium, phosphate, bicarbonate, calcium, citrate, gluconate, glucose, and sodium chloride. Of note, none of these solutions currently use amino acid supplementation. Nor do any version of PAS show a robust increase in platelet function; all solutions aim to preserve rather than enhance function.

There is a crucial need in the field of platelet transfusion medicine for novel platelet concentrates with better efficacy and safety. Currently, in the United States, platelet concentrates are stored at room temperature for out to 5 days, and in some cases 7 days with specialized pathogen testing. These room-temperature stored platelets (RT-PLT) are metabolically active, resulting in a rapid decline in function by the end of their short shelf life. As such, alternative storage solutions and/or conditions to retain hemostatic function are in high demand. This example (supplementation of stored platelet concentrates with taurine) establishes the potential to increase the function of stored platelets as compared to those platelets stored without taurine. In the case of preserved or enhanced function, there is potential opportunity for extended product shelf life.

As platelet function requires lots of energy, it was hypothesized that there may be specific alterations in platelet metabolism during cold storage that would be tied to the maintenance of function when compared to room temperature stored platelets. To answer this question, it was proposed to store platelets both at room temperature (RT-PLT, 18-22° C.) and in the cold (CS-PLT, 2-6° C.) and comprehensively assess metabolic, phenotypic, and functional changes over time (see FIG. 1). A multidimensional assessment of platelet function with respect to changes in metabolism that were associated with cold storage, and identifying/nominating metabolic pathways specific to cold storage-associated maintenance of platelet function were obtained.

Platelet concentrates were purchased our from ImpactLife. Frozen platelet pellets were prepared and used for metabolomic profiling. Many different metabolic shifts were identified and it was demonstrated that taurine/hypotaurine metabolism discriminated very strongly between study groups (RT-PLT, CS-PLT, at baseline, day 5, and day 21 of storage).

Figure 2:
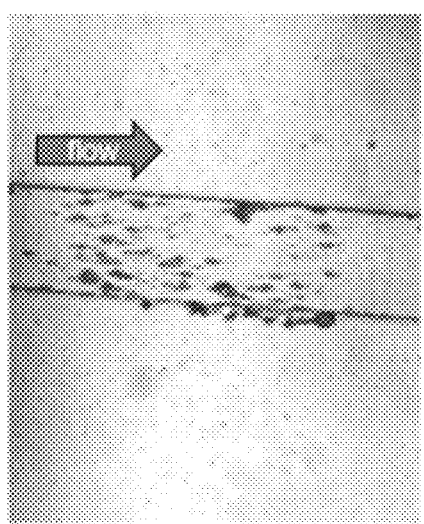
FIG. 2 shows stenotic microfluidic chamber and occlusion area under the curve.
Figure 2:
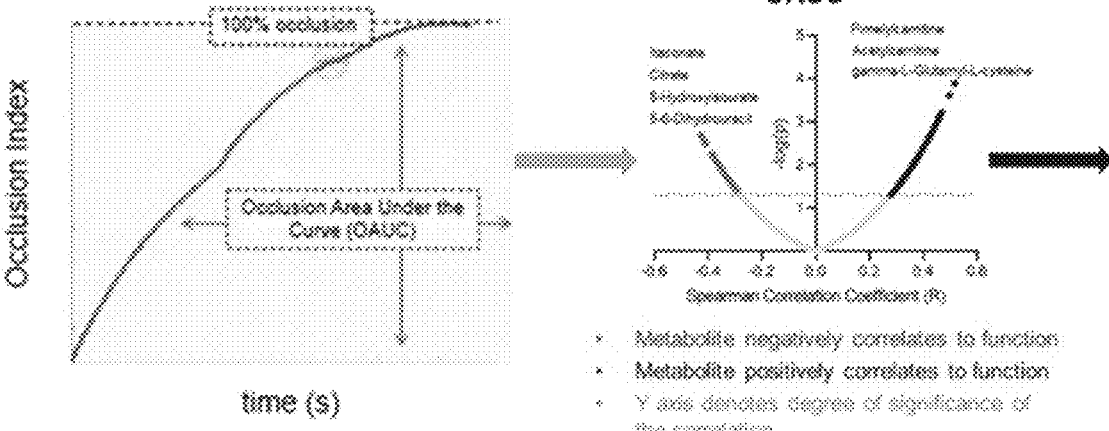
Figure 2:
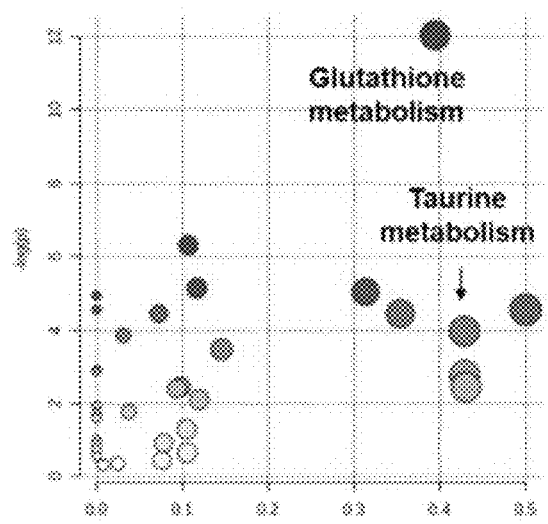

Next, the ability of the platelet concentrates to form an occlusive clot against an arterial pressure head in a stenotic microfluidic chamber coated with collagen was analyzed (FIG. 2). The important variable/metric extracted from this platelet function is the occlusion area under the curve, or OAUC; a larger OAUC implies faster and more robust occlusion, and thus improved hemostatic platelet function. It was found that two metabolic pathways were associated with OAUC in CS-PLT: glutathione and taurine/hypotaurine metabolism (FIG. 2).

Interestingly, antioxidant status has been shown as an important determinator of platelet function. Glutathione is a potent reducing agent that affects platelet function and that platelet aggregation is dependent on the ratio of oxidized to reduced glutathione. However, much less is known about the role of taurine in endogenous (non-platelet concentrates) platelet function, and in fact the literature is rather contradictory. In one 2010 study, platelets isolated from healthy human donors that had drank taurine-containing solutions were found to have increased ex vivo aggregation. In another study in humans from 1989, taurine supplementation in humans resulted in platelets with reduced aggregation when measured ex vivo. In this same publication, the authors demonstrated cats depleted of taurine had increased platelet aggregation. Rats fed taurine also had reduced platelet aggregation upon ex vivo assessment. In in vitro studies, taurine addition was found to inhibit platelet aggregation. Collectively, these reports suggested that the presence of taurine leads to inhibition of platelet aggregation, and the loss of taurine results in increased platelet aggregation.

Figure 3:
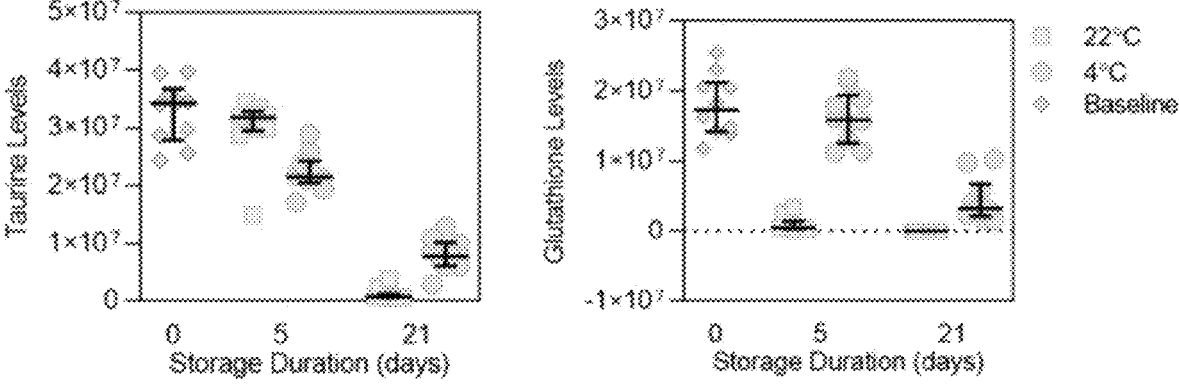
FIG. 3 shows reduction of taurine and glutathione from baseline at 21 days cold storage.
Figure 3:
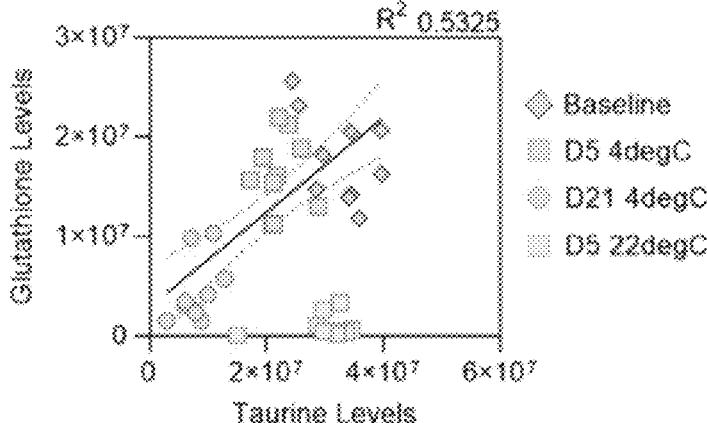
Figure 4:
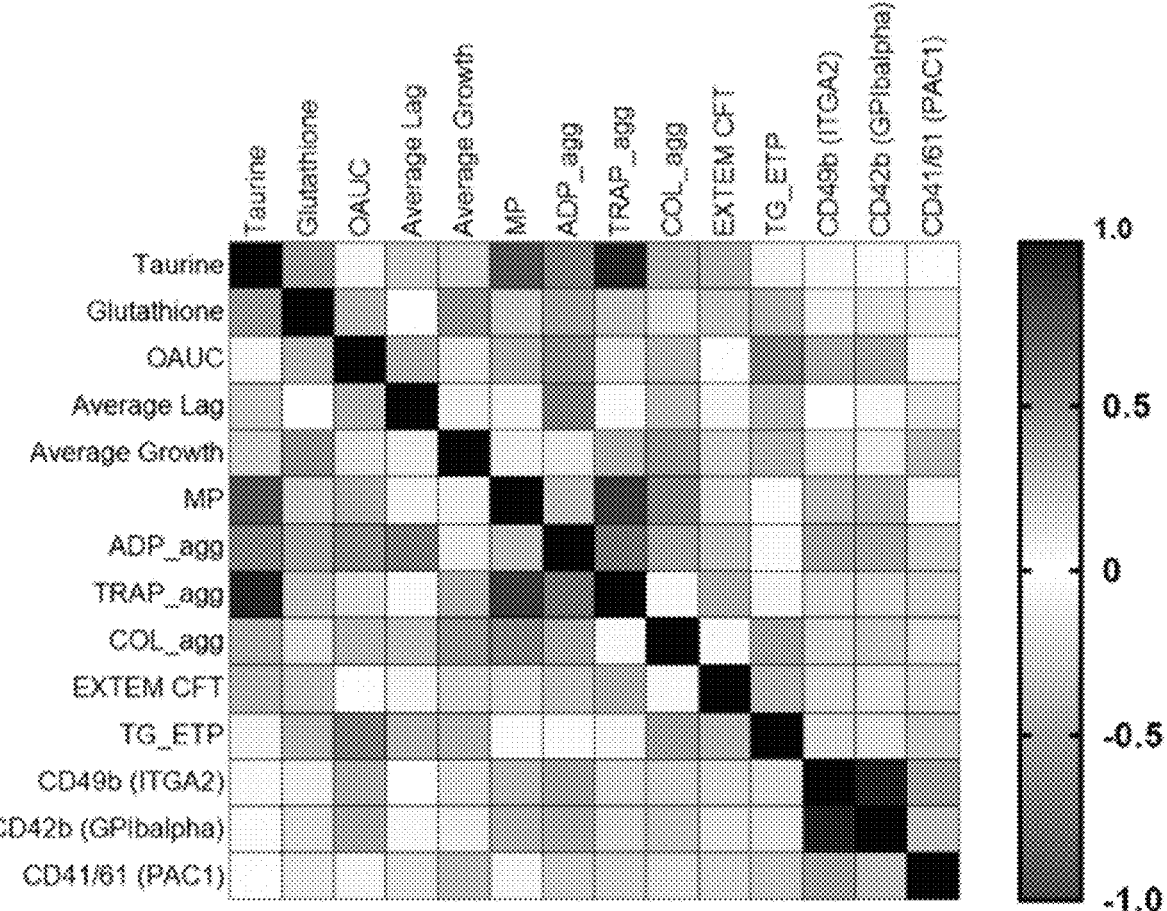
FIG. 4 shows a heatmap with taurine levels associating with platelet aggregation function.

The dataset was then re-analyzed to determine the taurine and glutathione levels over the course of storage, and to look for any correlation between glutathione and taurine. It was found that taurine levels decreased both in response to cold storage, and over the duration of storage (FIG. 3). In addition, glutathione levels were reduced with longer storage (FIG. 3), and there was a correlation between these two metabolites over the course of cold and not RT storage (FIG. 3). Next, an additional correlation matrix was made to assess relationships between taurine and glutathione levels and platelet function at day 21 of cold storage. It was found that taurine levels were more strongly associated with platelet aggregation function (FIG. 4). Suggesting that loss of taurine over the course of cold storage may be responsible for the improved platelet aggregation seen in CS-PLT when compared to RT-PLT.

To determine if this was the case, experiments were performed to supplement CS-PLT with taurine during storage, with the hypothesis that the supplemental (or "extra") taurine would lead to inhibition of aggregation, as similar to the aforementioned reports from the literature. Next, the platelet concentrates were supplemented at the beginning of storage with 500 µM taurine, and assayed for alterations in function using a microfluidic model of occlusion.

Figure 5:
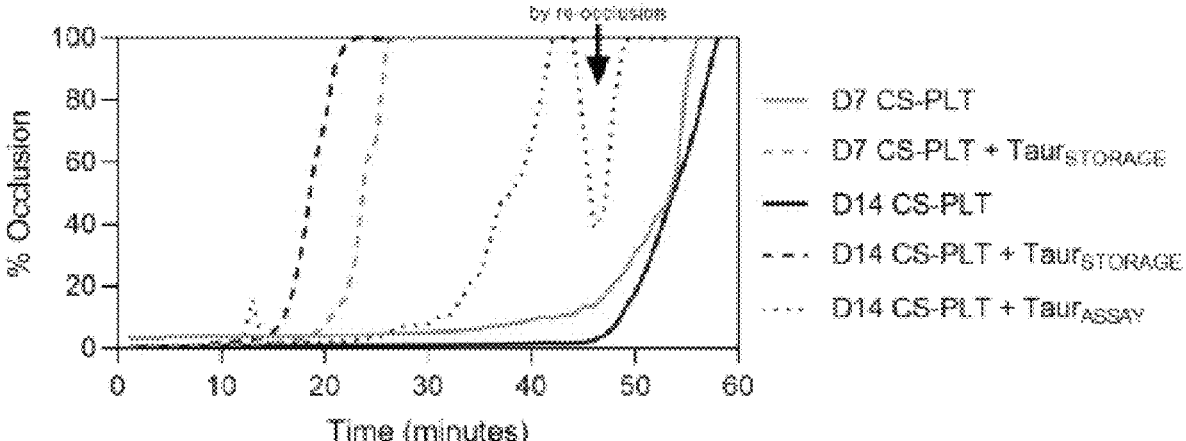
FIG. 5 shows occlusion curves at day 7 and day 14 with and without taurine.

Surprisingly, it was found that supplementation of CS-PLT with 500 µM taurine at the beginning of storage (TaurSTORAGE) in fact increased platelet aggregation, as seen by the left ward shift of the occlusion curves (increase in OAUC) in FIG. 5. Both D7 and D14 CS-PLT supplemented with taurine at the beginning of storage (dashed lines) occluded the microfluidic channel in half of the time that it took for the non-supplemented CS-PLT on those storage days to do so (solid lines). Even more interesting, exogenous taurine (500 µM) was added to D14 non-supplemented CS-PLT just prior to assessment for occlusion (TaurASSAY), and found a middle phenotype (dotted line), suggesting that addition of exogenous taurine to platelet concentrates promote aggregation.

As platelet activation, adhesion, and aggregation are bioenergetically demanding, and require intact functional mitochondria, it is believed that taurine supplementation at the beginning of storage leads to platelet mitochondrial stabilization and therefore improves adhesion and aggregation under physiological flow. Notably, taurine-associated enhancement of CS-PLT function due to mitochondrial stability, is a mechanism unique to platelet concentrate supplementation as red blood cells do not contain mitochondria, and therefore must rely on an alternate mechanism for taurine-associated improvements in function. The use of CS-PLT is on the rise in actively bleeding patients, where every minute of resuscitation counts. If supplementation of CS-PLT with taurine would result in a twice-as-fast acting platelet concentrate, this has the potential to decrease the resuscitation window in actively bleeding patients, and potentially improve outcomes in this patient population.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The term "about" or "approximately" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, particularly with respect to biological systems or processes, the term can mean within an order of magnitude, preferably within 2-fold, of a value. Where particular values are described in the application and claims, unless otherwise stated, the term "about" is implicit and in this context means within an acceptable error range for the particular value.

The terms "composition" and "formulation" are used interchangeably.

A "subject" to which administration is contemplated includes, but is not limited to, humans (i.e., a male or female of any age group, e.g., a pediatric subject (e.g., infant, child, adolescent) or adult subject (e.g., young adult, middle-aged adult, or senior adult)) and/or other non-human animals, for example, mammals (e.g., primates (e.g., cynomolgus monkeys, rhesus monkeys); commercially relevant mammals such as cattle, pigs, horses, sheep, goats, cats, and/or dogs); and birds (e.g., commercially relevant birds such as chickens, ducks, geese, and/or turkeys). In certain embodiments, the animal is a mammal. The animal may be a male or female at any stage of development. The animal may be a transgenic animal or genetically engineered animal. In certain embodiments, the subject is a non-human animal. In certain embodiments, the animal is a fish or reptile.

The term "administer," "administering," or "administration" refers to implanting, absorbing, ingesting, injecting, inhaling, or otherwise introducing a compound or cell described herein or generated as described herein, or a composition thereof, in or on a subject.

The terms "treatment," "treat," and "treating" refer to reversing, alleviating, delaying the onset of, or inhibiting the progress of a disease. In some embodiments, treatment may be administered after one or more signs or symptoms of the disease have developed or have been observed. In other embodiments, treatment may be administered in the absence of signs or symptoms of the disease. For example, treatment may be administered to a susceptible subject prior to the onset of symptoms (e.g., in light of a history of symptoms and/or in light of exposure to a pathogen and/or in light of detecting that the subject has a genotype associated with the disease). Treatment may also be continued after symptoms have resolved, for example, to delay or prevent recurrence.

The terms "condition," "disease," and "disorder" are used interchangeably.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A composition comprising isolated platelets and about 650 μM to about 1000 μM of taurine or a functional derivative thereof, wherein the composition is stored at about 0 to 8° C.

2. The composition of claim 1, further comprising acetate, potassium, magnesium, phosphate, bicarbonate, calcium, citrate, gluconate, glucose, sodium chloride, or any combination thereof.

3. The composition of claim 1, wherein the composition is stored at a temperature of about 2 to 8° C.

4. A method of storing platelets prior to administration into a subject, the method comprising:

providing platelets;

providing a platelet additive solution comprising about 250 μM to about 1000 μM taurine or a functional derivative thereof;

contacting the platelets and the platelet additive solution, resulting in treated platelets; and storing the treated platelets for at least 2 days at a temperature of about 0 to 8° C.

5. The method of claim 4, wherein the platelet additive solution further comprises acetate, potassium, magnesium, phosphate, bicarbonate, calcium, citrate, gluconate, glucose, sodium chloride, or any combination thereof.

6. The method of claim 4, wherein the treated platelets exhibit an increase in platelet function comprising enhanced platelet aggregation, stabilized platelet mitochondria, increased shelf-life, compared to platelets stored in a solution without the taurine or a functional derivative thereof.

7. The method of claim 6, wherein platelet function is measured under flow conditions and wherein the increase in platelet function is measured by an increase in hemostatic function under physiologically relevant flow.

8. The method of claim 4, wherein the treated platelets stored in the platelet additive solution are twice-as-fast acting or acts in half the time as platelets stored in a solution without the taurine or functional derivative thereof.

9. The methods of claim 4, wherein the platelets are contacted with the platelet additive solution at the beginning of storage or during storage.

10. The method of claim 4, wherein the treated platelets are stored for at least 5, at least 7, at least 14, or at least 21 days.

11. The method of claim 4, wherein the amount of taurine or functional derivative thereof is about 500 μM.

12. The method of claim 4, wherein the treated platelets are stored for about 21 days.

13. The method of claim 4, wherein the subject is a cancer patient.

14. The method of claim 4, wherein the subject has internal bleeding.

15. The method of claim 4, wherein the subject is an actively bleeding patient.

16. The method of claim 4, wherein the subject is being treated or has been treated with chemotherapy.

17. The method of claim 4, wherein the temperature is about 2 to 8° C.

\* \* \* \* \*